June 25, 1940. E. OKUN Re. 21,492
FOLDING UMBRELLA
Original Filed Jan. 15, 1939 2 Sheets-Sheet 1
Fig. 1
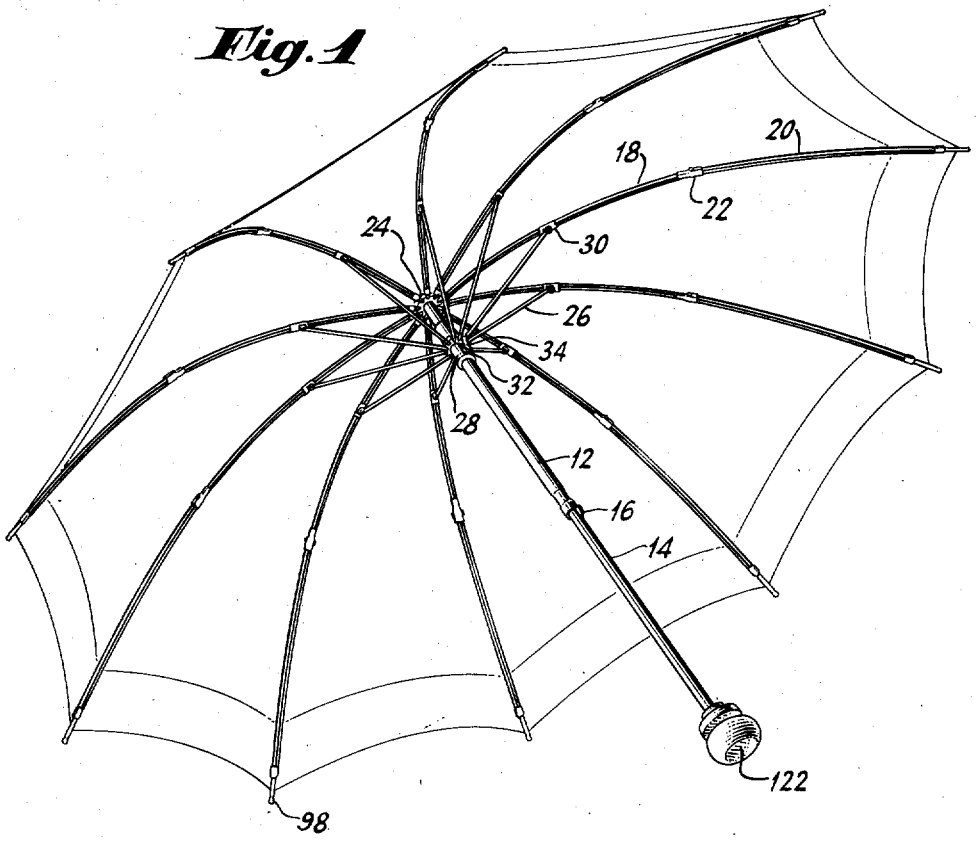
Fig. 5
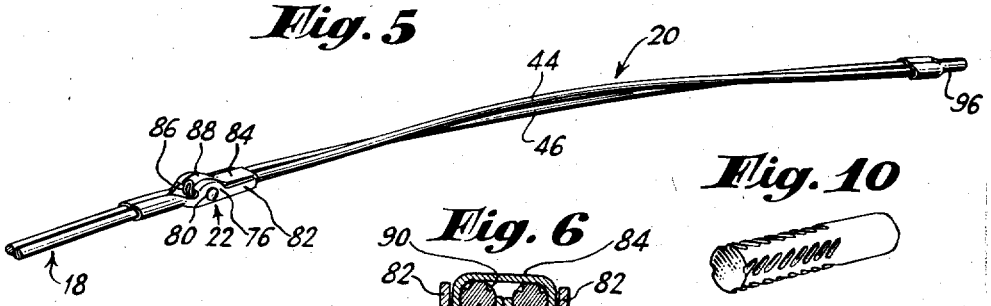
Fig. 6
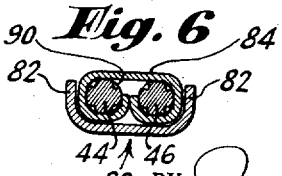
Fig. 10
INVENTOR.
EDWARD OKUN
BY James & Franklin
ATTORNEY.

June 25, 1940. E. OKUN Re. 21,492

FOLDING UMBRELLA

Original Filed Jan. 15, 1939 2 Sheets-Sheet 2

INVENTOR.
EDWARD OKUN

BY James & Franklin

ATTORNEY.

Reissued June 25, 1940

Re. 21,492

UNITED STATES PATENT OFFICE 21,492

FOLDING UMBRELLA

Edward Okun, New York, N. Y., assignor to American Folding Umbrella Corporation, New York, N. Y., a corporation of New York Original No. 2,177,458, dated October 24, 1939, Serial No. 185,105, January 15, 1938. Application for reissue April 4, 1940, Serial No. 327,887

22 Claims. (Cl. 135—25)

This invention relates to umbrellas, and more particularly to folding umbrellas, and the primary object of the invention is to generally improve such umbrellas.

Umbrellas which fold to particularly small dimension by making the umbrella stick of telescopic parts and by articulating the ribs, are already known. Such an umbrella is described in my Patent No. 2,068,067, granted January 19, 1937. As heretofore constructed, the ribs are made of strips of metal having a substantially rectangular section. The section is made rectangular with a view to obtaining flexibility in one direction, together with adequate strength, and with a further view to minimizing the overall diameter of the umbrella when it is folded. The ends of the ribs are twisted and machined to facilitate articulation of the ribs and pivoting of the ribs on the umbrella stick.

The resulting structure has proved to be unsatisfactory for a number of reasons. The ribs have no sideward flexibility, being flexible only in one direction. Moreover, to avoid excess weight and in order to facilitate working or machining the ends of the ribs, it has been found necessary to make the same of a comparatively soft pliable metal. The raw stock as purchased by the umbrella manufacturer cannot be prehardened because then it cannot be satisfactorily worked, and it is not feasible to harden the parts after fabricating the same, first, because of the large attendant expense, and second, because of substantial warping of the parts during hardening. In consequence, the ribs are left soft, and this is disadvantageous because if deformed during use, they take a set or deformed position, which spoils the appearance of the umbrella when open, and the compactness when closed. Moreover, the difficulty has been a self-aggravating one, because with a soft pliable metal it has been necessary to use metal of larger section, and this in turn causes the completed umbrellas to look undesirably cumbersome, metallic and machine-like, and prevents the umbrella from folding to the desired small-diameter, compact condition.

One important object of the present invention is to overcome the foregoing difficulties, and in accordance with a feature of my invention, I employ slender round wire stock which is hardened steel or other appropriate spring metal. The wire is inexpensive because of its simple round section, and may be very slender because of its resilient character, and even more importantly, because the desired stability and breadth of section is obtained by using a plurality, preferably two, such wires in collateral relation. In this way adequate strength is obtained, together with flexibility, and at the same time the structure folds to very small diametrical dimension. Special fittings are used at the ends of the wires, thus avoiding working of the metal.

In accordance with a further feature and object of the invention, the ribs are flexible in all directions, despite the fact that the section is broad in one direction. Sideward bending of the rib is accommodated by the flexibility of the rib itself, and does not result in loosening the hinge.

A further and more detailed object centers about the attachment of the fittings to the wires. To solder or braze the parts is prohibitively expensive, and welding spoils the temper of the spring wire. I find it desirable to use a non-ferrous or rust-proof metal for the fittings in order to prevent binding at the pivots, and this metal is relatively soft. By roughening or knurling the hardened wire, the fitting may be clamped on the wire and securely attached because of interlocking of the hard and soft metals.

To the accomplishment of the foregoing and such other objects as will hereinafter appear, my invention consists in the umbrella elements and their relation one to the other, as hereinafter are more particularly described in the specification and sought to be defined in the claims. The specification is accompanied by drawings in which:

Fig. 1 is a perspective view of the under side of an umbrella embodying features of my invention;

Fig. 5 is explanatory of the sideward flexibility of my improved umbrella rib;

Fig. 6 is a section taken through the hinge of the rib taken in the plan of the line 6—6 of Fig. 2;

Fig. 10 shows a wire knurled to ensure secure attachment of the fitting.

Figure 2:
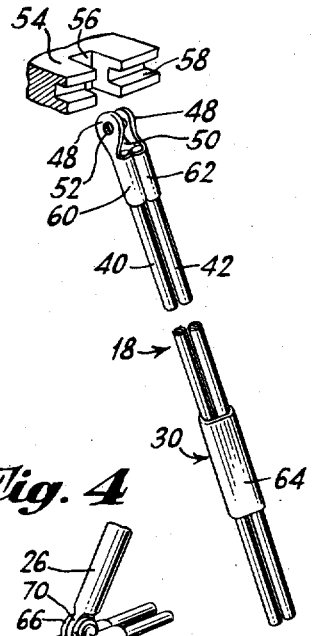
Fig. 2 is a perspective view of a rib constructed in accordance with my invention.

Referring to the drawings, and more particularly to Fig. 1, the umbrella comprises an umbrella stick having telescopically related parts 12 and 14, these preferably being made of tubular metal and having a spring detent 16 for holding the parts in extended relation when the umbrella is being used. The ribs are articulated, there being upper ribs 18 and lower ribs 20 hingedly connected together at 22. The upper and lower ribs each consist of a pair of collaterally disposed spring wires, these wires preferably being of simple round section. With the construction shown, the wires may be very slender so that the finished umbrella does not have the cumbersome heavy metallic and machine-like appearance of conventional folding umbrellas. The upper ribs 18 are pivotally connected to the upper stick portion 12 at 24. Spreaders 26 are provided, these being connected at their lower ends to a tubular runner 28 which is slidable on upper stick 12. The upper ends of spreaders 26 are pivotally connected to upper ribs 18 by means of appropriate fittings 30. The runner 28 is held in the top position shown, that is, with the ribs in spread condition, by means of an appropriate detent 32 mounted on the umbrella stick, and this detent is released by a special fingerpiece 34 pivotally mounted on runner 28.

Considering the construction of the umbrella in greater detail, and referring now to Fig. 2 of the drawings, the upper rib 18 comprises wires 40 and 42 arranged in side by side or collateral relation. The lower rib 20 similarly comprises collaterally disposed wires 44 and 46. The twin wires 44 and 46 may be and preferably are slightly smaller in diameter than the twin wires 40 and 42. In one specific example, which has worked out well in practice, the wires 40 and 42 are .066″ in diameter, while wires 44 and 46 are .062″ in diameter. The wires may be made of steel or other suitable resilient material, and these wires may be appropriately hardened or tempered because no attempt is made to machine or work the same, the connections to the wires being made by special fittings which are next described.

The fittings as here illustrated are all formed of sheet metal. They are preferably made of a non-ferrous metal, for example, nickel-silver, or brass, in order to prevent any possibility of rusting at the pivotal connections. Rusting of the wires is prevented by electro-plating the entire rib and spreader assembly after the parts have been fabricated, but inasmuch as the plating may be worn away at the pivotal connections, I prefer to use non-ferrous metal for such connections. The end pivot fitting at the upper end of the rib 18 consists of a body of sheet metal the upper end of which is shaped and bent to form parallel ears 48 preferably connected by a web of metal 50 extending therebetween. The ears 48 are perforated at 52 for pivotal connection to the top of the umbrella stick. This is done by using a conventional peripherally channeled head 54, preferably made of non-ferrous metal, the circumference of which is slotted at 56 to receive ears 48. A pivot wire, not shown, passes through the perforations 52 and is anchored in channel 58. The lower part of the sheet metal body encompasses the ends of wires 40 and 42. More specifically, the side edge 60 is curled about wire 40 and the side edge 62 is curled about wire 42. The parts may conceivably be additionally secured together by soldering, brazing, spot-welding, or other appropriate means. But soldering and brazing are prohibitively expensive, and welding spoils the temper of the spring metal and makes the same excessively brittle. I have, therefore, devised a different mode of attachment and find that an adequate secure attachment of the parts may be obtained by preliminarily roughening or knurling the ends of the wire, and thereafter clamping the fitting on the roughened ends. The form of the knurling may vary, but that shown in Fig. 10 is adequate and is convenient because it may be produced by simple reciprocating V-shaped dies moved toward one another against the wire, thus indenting or ridging the same on four sides. The curling of the edges 60 and 62 about the wires serves not only to secure the fitting to each of the wires, but also, to space the wires somewhat apart, and this is desirable in order to give the rib a broad over-all section while using slender wire.

Figure 4:
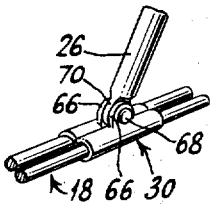
Fig. 4 shows the connection between the upper end of the spreader and the rib.
Figure 4:
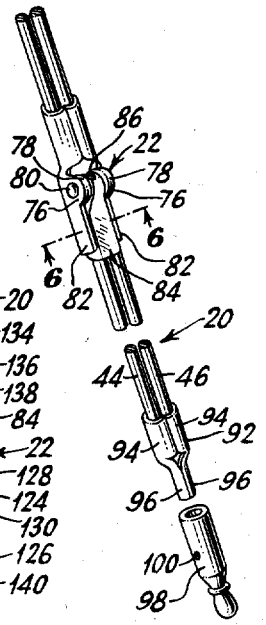

The fitting 30 is wrapped about the wires approximately midway between the ends thereof. It is folded in the opposite direction, that is, with the closed side 64 outermost. The construction of this fitting is best shown in Fig. 4, in which it will be seen that ears 66 are formed at the edges of a piece of sheet metal, these ears being bent to parallel spaced position and perforated to receive a pivot pin 68. Spreader 26 is made of a single piece of round wire of somewhat greater diameter and its upper end is pinched or flattened at 70 to fit between ears 66, the part 70 being perforated to receive pin 68. Spreader 26 need not be and is preferably not made of tempered carbon steel wire, but is merely cold rolled, it being somewhat heavier in diameter, say $\frac{3}{32}$″. This material is readily worked to form the end 70. The edges of the sheet metal fitting on each side of the ears 66 are curled around the respectively adjacent rib wires, and here again, the construction is such that the fitting is independently clamped onto each of the wires and the wires are preferably separated by the edges of the fitting, that is, by an amount equal to double the thickness of the sheet material used for the fitting. Here also, the rib wires may be roughened or knurled before clamping the fitting in place.

The lower ends of spreaders 26 are similarly pinched to form flattened parts 72 (Fig. 3) which are perforated to receive wire 74 secured in channel 76 extending about the periphery of the upper end of runner 28.

The hinge fitting 22 has pivotally connected outer and inner portions. The outer portion has ears 76 formed at its side edges, and these ears are preferably refined by inwardly turned flanges 78 which are smooth and rounded and the object of which is to prevent abrasion and wear of the fabric covering of the umbrella, it being understood that the ears 76 face outwardly or toward the fabric. The ears are perforated to receive a hinge pin 80. Above ears 76 the edges of the sheet metal are turned inwardly around the respectively adjacent rib wires, the edges terminating between the wires and thereby spacing the same as was previously explained. Here again, the ends of the wires are preliminarily roughened or knurled to insure a secure grip by the fitting on the wires.

Below the ears 76 the edges of the metal form parallel guide flanges 82, the relation of these flanges being best shown in Fig. 6. The flanges are so spaced as to receive the lower hinge portion 84, thereby holding the upper and lower ribs in alignment.

The lower or inner hinge part 84 follows the general character of construction previously explained, that is, it consists of a piece of preferably non-ferrous sheet material the upper part of which is bent to form perforated ears 86, best shown in Fig. 5, these ears being connected by a web of metal 88 which strengthens and rigidifies the fitting and which additionally functions to present a smooth surface to the umbrella fabric. The lower part of the fitting encompasses the upper ends of wires 44 and 46, the edges of the metal being curled about the respectively adjacent wires and the wires being preliminarily roughened as aforesaid. Here again, the edges of the fitting terminating between the wires function to slightly space the wires. The lower hinge part is preferably the same as the pivot fitting numbered 48, 50, etc., at the upper end of the rib, but faces in opposite direction.

While it is not new to use guide flanges 82 to hold the upper and lower ribs in alignment, I may point out that with the present construction, the guide flanges function successfully and admirably for the intended purpose, whereas with a rectangular rib having a twisted end, the guide flanges were not particularly successful, this being due to the fact that most of the length of that part of the lower rib coming between the guide flanges was twisted to form a part of the hinge, thus affording very little bearing surface between the lower rib and the guide flanges. With the present construction, the sides of the hinge part 84 are parallel up to a point very close to the hinge pin, and substantial bearing surface is obtained between the parts, as will be seen in Figs. 2 and 5. The relation between these parts will be evident from inspection of Fig. 6 which, incidentally, shows the curling of the edges of the fitting about the wire as well as the indentations 90 which are visible because the indentations here used are biased rather than strictly transverse of the wire.

The end tip fitting 92 consists of a piece of sheet material the edges 90 of the upper part of which are curled around the respectively adjacent wires, the wires being preliminarily knurled, all as has been explained. The lower part of the fitting is narrower than the upper part and its edges 96 are turned toward one another to form a single tubular end which is well adapted to receive any appropriate ornamental tip, such as the tip 98 shown in the drawings. These tips are customarily made of colored plastic material rather than metal, and may be perforated, as shown at 100, to receive a thread holding the umbrella fabric in proper position. The metal blank for the fitting is somewhat T-shaped, with the parts of the T exaggeratedly broad. The ends of the upper part of the T are curled about the wires, while the lower part of the T is curled to form a tubular end.

The flexibility of my novel improved double wire rib in a direction perpendicular to the plane of the two wires, that is, in a direction accommodating the curvature of the ribs when the umbrella is opened, as shown in Fig. 1, will be self-evident, for the wires are slender and are located side by side, and both bend together. The manner in which the rib will accommodate sideward bending, that is, bending in the plane of the two wires, is not so evident, but will be understood by reference to Fig. 5, in which it will be seen that if the tip 96 of the rib is bent sidewardly, the rib accommodates the bend because one of the wires, in this case the wire 44, rides over and takes a curvature different from and independent of the other wire 46. This avoids excessive strain on the hinge 22, and the initial fit between the guide flanges 82 and the lower hinge part 84 is maintained throughout the life of the umbrella.

Figure 3:
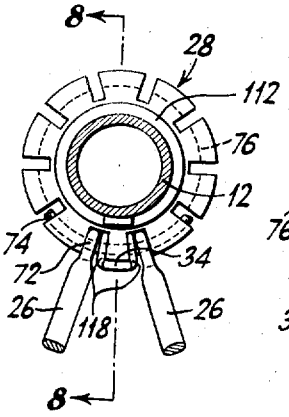
Fig. 3 is a horizontal section taken through the runner, and showing the connection between the lower end of the spreader and the runner.
Figure 7:
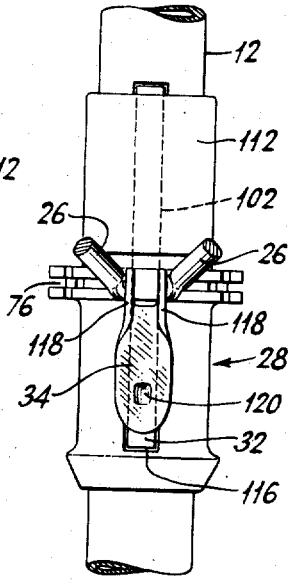
Fig. 7 is a side elevation of the runner.
Figure 8:
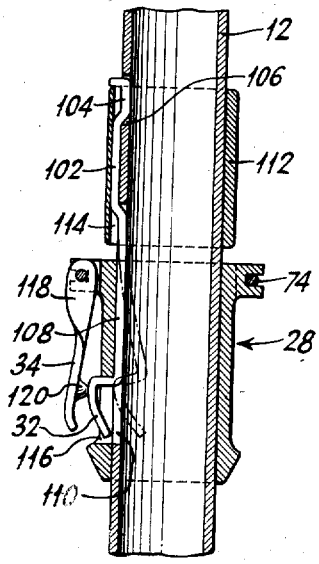
Fig. 8 is a transverse section through the runner taken in the plane of the line 8—8 of Fig. 3.

Referring now to Figs. 3, 7, and 8, the upper umbrella stick 12 is provided with a spring detent 32 formed at the lower end of a piece of spring metal 102 having an inwardly bent part 104 received in a mating slot 106. The lower part 108 of the detent spring is oscillatable in a slot 110. The spring is held anchored in position on stick 12 by a ring 112, one side of which is grooved at 114 to receive spring 102. The lower end or operative part 32 of the detent is dimensioned to fit into a mating slot 116 cut through the side wall of runner 28, as is best shown in Fig. 8. Runner 28 is provided with a fingerpiece 34 disposed in front of detent 32, and provided with ears 118 perforated to receive the wire 74 (see Figs. 3, 7, and 8). The lower part of fingerpiece 34 is indented at 120, forming a protuberance which bears against detent 32 and moves it into the umbrella stick and clear of the runner when it is desired to close the umbrella. Fingerpiece 34 is broad and smooth compared to the tiny surfaces of detent 32, and is therefore more comfortable to use.

Figure 9:
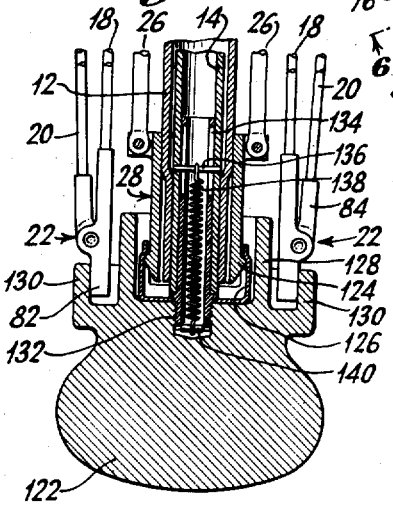
Fig. 9 is a section through the handle of the umbrella with the umbrella in folded condition.

Referring now to Fig. 9, I there show the lower end of the umbrella when it is in closed condition. The upper tube 12 is moved down over the lower tube 14. The lower tube carries a suitable ornamental handle 122, this preferably being made of a suitable plastic composition. Handle 122 is provided with an inner flange 128 which receives the lower end of runner 28. A spring 126 may be carried within flange 128 for cooperation with a ledge 124 formed at the lower end of the runner. The handle 122 may also be provided with an outer flange 130. This encompasses and protectively houses the lower ends of hinges 22 and particularly the guide flanges 82 thereof. Flange 130 also functions to receive the tips 98 of the umbrella when the umbrella is closed without folding the same to half length. For this purpose, the handle 122 is preferably made slightly reciprocable with respect to the lower tube 14 on which it is mounted. More specifically, handle 122 is threadedly mounted on an auxiliary tube 132, this tube being limitedly slidable within the lower end of tube 14. To limit the motion of tube 132, it is slotted at 134 to receive a pin 136 which passes diametrically through and is anchored in tube 14. Pin 136 also functions to hold the upper end of a spring 138 the lower end of which is connected to the handle and tube 132 by means of a pin 140. It will be evident that spring 138 normally holds handle 122 in the position shown, but that the handle may be pulled outwardly somewhat when it is desired to receive the tips 98 of the umbrella ribs therewithin, in order to hold the umbrella in closed condition when the umbrella has not yet been folded to half length, as, for example, when the umbrella is still wet, or is going to be further used in the course of a rainy day.

It is believed that the construction and operation, as well as the many advantages of my improved folding umbrella, will be apparent from the foregoing detailed description thereof. It will also be apparent that, while I have shown and described my invention in a preferred form, many changes and modifications may be made in the structure disclosed without departing from the spirit of the invention defined in the following claims.

I claim:

1. A folding umbrella rib comprising hingedly connected upper and lower ribs each consisting of a plurality of wires arranged side by side.

2. A folding umbrella rib comprising hingedly connected upper and lower ribs, each including a pair of collaterally arranged wires, said wires being made of suitably hardened spring metal, and fittings made of soft rust-proof metal secured to the ends of said wires and functioning to hold the same in desired relation and to hingedly connect the upper and lower ribs.

3. A folding umbrella rib comprising pairs of collateral resilient wires acting as upper and lower ribs, and sheet metal fittings secured to said wires, the fittings each comprising connected perforated ears projecting from a sheet metal body encompassing the wires, the side edges of said body being curled around the respectively adjacent wires to secure the same to each of the wires and to hold the wires in slightly spaced relation.

4. A folding umbrella rib comprising pairs of collateral wires acting as upper and lower ribs, said wires being made of hardened spring metal and having knurled ends, and soft rust-proof sheet metal fittings secured to said wires, the fittings each comprising connected perforated ears projecting from a sheet metal body encompassing the wires, the side edges of said body being curled around the knurled ends of the respectively adjacent wires.

5. A folding umbrella rib comprising collapsibly related upper and lower ribs, the upper and lower ribs each comprising a pair of collateral resilient solid wires, and a fitting at the lower end of the lower rib consisting of a generally T-shaped sheet metal body, the upper part of which has one side curled around the end of one wire and the other side curled around the end of the other wire, while the lower part of said fitting is curled to itself form a single tubular tip at the end of the double rib for receiving a conventional ornament.

6. A folding umbrella rib comprising pairs of collateral resilient wires acting as upper and lower ribs, and sheet metal fittings secured to said wires, the fittings at the lower end of said upper rib comprising a sheet metal body the middle part of which forms ears for receiving a hinge pin, the side edges above said ears being curled around the respectively adjacent wires of the upper rib and the side edges below said ears forming a guide channel for receiving the fitting at the upper end of the lower rib, and the fitting at the upper end of the lower rib comprising a pair of connected perforated ears to receive the hinge pin and projecting upwardly from a sheet metal body the edges of which are curled around the respectively adjacent wires of the lower rib.

7. A folding umbrella rib comprising pairs of collateral wires acting as upper and lower ribs, said wires being resilient and round in section, and sheet metal fittings secured to said wires, the fitting at the upper end of the upper rib comprising connected perforated ears projecting from a sheet metal body encompassing the wires, the side edges of said body being curled around the respectively adjacent wires, the fitting at the middle of the upper rib comprising a sheet metal body having depending perforated ears at the middle, the edges of said body above and below said ears being curled around the respectively adjacent wires, the fitting at the lower end of said upper rib comprising a sheet metal body the middle part of which forms ears for receiving a hinge pin, the side edges above said ears being curled around the respectively adjacent wires of the upper rib and the side edges below said ears forming a guide channel for receiving the fitting at the upper end of the lower rib, the fitting at the upper end of the lower rib comprising a pair of connected perforated ears projecting upwardly from a sheet metal body the edges of which are curled around the respectively adjacent wires of the lower rib, the fitting at the lower end of the lower rib consisting of a sheet metal body, the upper part of which has its side edges curled around the respectively adjacent wires and the lower part of which is curled to form a single tubular tip for receiving a conventional ornament.

8. A folding umbrella rib comprising articulated upper and lower ribs connected together by a suitable pivotal connection, the upper rib and lower rib each comprising a plurality of solid round wires arranged side by side and made of comparatively hard springy metal.

9. A folding umbrella rib comprising articulated upper and lower ribs connected together by a suitable pivotal connection, the upper rib and lower rib each comprising two solid wires arranged side by side, said wires being made of comparatively hard springy metal and having a simple round section, and the upper wires being slightly larger in diameter than the lower wires.

10. A folding umbrella rib comprising articulated upper and lower ribs, each upper rib and lower rib comprising twin resilient wires arranged side by side, said wires being made of hardened spring metal and having knurled ends, and fittings formed of soft rust-proof sheet metal and secured to the ends of the ribs, the side edges of said fittings being curled around the knurled ends of the respectively adjacent wires.

11. A folding umbrella comprising articulated upper and lower ribs connected together by a suitable pivotal connection, a runner, and spreaders connected between said runner and the upper ribs, each upper rib and lower rib comprising a plurality of slender wires made of hard resilient material and arranged side by side, the spreaders being made of softer thicker wire and having flattened perforated ends, and fittings formed of sheet metal and secured to the ribs, the fittings each comprising perforated ears projecting from a sheet metal body encompassing the wires, the side edges of said body being curled around the respectively adjacent wires, the upper flattened perforated ends of the spreaders being pivotally received between the perforated ears of the fittings, and the lower flattened perforated ends of the spreaders being pivotally received by the runner.

12. A folding umbrella rib comprising articulated upper and lower ribs, each upper rib and lower rib comprising twin resilient wires arranged side by side, said wires having a simple round section with the wires of the upper ribs slightly larger in diameter than the wires of the lower ribs, and fittings formed of sheet metal and secured to the ribs, the fittings each comprising perforated ears projecting from a sheet metal body encompassing the wires, the side edges of said body being curled around the respectively adjacent wires.

13. A folding umbrella rib comprising articulated upper and lower ribs, each upper rib and lower rib comprising twin resilient wires arranged side by side, said wires being made of hardened spring metal and having knurled ends, and fittings secured to the ends of the ribs, said fittings encompassing the knurled ends of the ribs for secure attachment thereto.

14. An end tip fitting, for an umbrella part comprising a pair of collateral wires, said end tip fitting consisting of a sheet metal body, the upper part of the body being wider than the lower part and having one side folded around and clamped against the end of one of the wires, and having its other side folded around and clamped against the end of the collateral wire, while the narrower lower part of said fitting forms a single end for receiving a conventional ornamental tip.

15. An end tip fitting, for an umbrella rib comprising a pair of collateral round spring wires having knurled ends, said end tip fitting consisting of a somewhat T-shaped sheet metal body made of metal softer than the wires, the upper part of the T-shaped body having one end curled around and compressed against the knurled end of one of the wires, and having its other end curled around and compressed against the knurled end of the collateral wire, while the lower part of said fitting is curled to itself form a single tubular end for receiving a conventional ornamental tip.

16. A hinge fitting for hingedly connecting umbrella parts made up of collateral wires, said hinge fitting comprising pivotally connected inner and outer portions made of sheet metal, the inner portion including a part folded around and clamped against the end of one wire, a part folded around and clamped against the end of the collateral wire, and perforated side walls, the outer portion having a part folded around and clamped against the end of one wire, and another part folded around and clamped against the end of the collateral wire, and spaced connected side walls perforated to receive a hinge pin with the aforesaid perforated side walls of the inner portion disposed therebetween, said connected side walls of the outer portion being extended beyond the hinge pin to form a guide housing for receiving the folded portion of the inner fitting.

17. A hinge fitting for hingedly connecting the upper and lower parts of a folding umbrella rib made up of collateral round spring wires having knurled ends, said hinge fitting comprising pivotally connected inner and outer portions made of sheet material softer than the wires, the inner portion including a part folded about and compressed against the knurled end of one wire, a part folded about and compressed against the knurled end of the collateral wire, and connected perforated side walls, the outer portion having a part folded around and compressed against the knurled end of one wire, and another part folded around and compressed against the knurled end of the collateral wire, and spaced ears perforated to receive a hinge pin with the aforesaid perforated side walls of the inner portion disposed therebetween, the exposed edges of the ears being flanged inwardly, said outer portion being longitudinally extended beyond the hinge pin to form a guide housing for receiving the folded portion of the inner fitting.

18. A fitting for pivotally connecting an umbrella part to another umbrella part made up of collateral wires, said fitting comprising a piece of sheet metal having a main part with ears projecting transversely therefrom and perforated to provide bearing holes, one side of the main part being curled around and clamped against one of the wires, and the other side of the main part being curled around and clamped against the other wire, while the two ears are brought into spaced collateral relation for receiving a pivot.

19. A fitting for pivotally connecting a spreader to a rib made up of collateral spring wires which are roughened or knurled at the point where the fitting is secured, said fitting comprising a piece of sheet material softer than the wires and having a main part with ears projecting transversely from the side edges thereof and perforated to provide bearing holes, one side of the main part being curled around and compressed against the knurled part of one of the wires, and the other side of the main part being curled around and compressed against the knurled part of the other wire, while the two ears are brought into spaced collateral relation for receiving a pivot.

20. An end pivot fitting, for an umbrella part comprising a pair of collateral wires, said end pivot fitting being made of sheet metal and having a part folded around and clamped against the end of one of the wires, and another part folded about and clamped against the end of the collateral wire, the remainder of said fitting projecting beyond the ends of the wires and being shaped to form side walls which are perforated to receive a pivot.

21. An end pivot fitting, for an umbrella part comprising a pair of collateral spring wires having knurled ends, said end pivot fitting being made of sheet metal softer than the wires and having a part curled around and compressed against the knurled end of one of the wires, and another part curled about and compressed against the knurled end of the collateral wire, the remainder of said fitting projecting beyond the ends of the wires and being shaped to form adjacent side walls which are perforated to receive a pivot, and which are connected by an integral web of metal.

22. An umbrella part comprising a pair of collateral round spring wires having knurled ends and pivotal fittings at the ends of said umbrella part, said pivotal fittings each being made of sheet metal softer than the wires and each having a part curled about and clamped against the knurled end of one of the wires and another part curled about and clamped against the adjacent knurled end of the other wire, and side walls extending outwardly from said parts beyond the ends of the wires, said side walls being perforated to receive a pivot.

EDWARD OKUN.